United States Patent
DiGiacomo et al.

(10) Patent No.: US 11,868,147 B2
(45) Date of Patent: Jan. 9, 2024

(54) OPTICAL EMISSION SPECTROSCOPY CONTROL OF GAS FLOW IN PROCESSING CHAMBERS

(71) Applicant: Applied Materials, Inc., Santa Clara, CA (US)

(72) Inventors: Philip DiGiacomo, Palo Alto, CA (US); Sunil Kumar Garg, Santa Clara, CA (US); Paul G. Kiely, Santa Cruz, CA (US); Keith A. Miller, Sunnyvale, CA (US); Rajat Agrawal, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 364 days.

(21) Appl. No.: 17/198,619

(22) Filed: Mar. 11, 2021

(65) Prior Publication Data
US 2022/0291702 A1 Sep. 15, 2022

(51) Int. Cl.
*G05D 11/13* (2006.01)
*G05B 15/02* (2006.01)
*G01N 21/67* (2006.01)

(52) U.S. Cl.
CPC ............ *G05D 11/138* (2013.01); *G01N 21/67* (2013.01); *G05B 15/02* (2013.01)

(58) Field of Classification Search
CPC ...... G05D 11/138; G05D 21/02; G01N 21/67; G01N 21/68; G01N 2021/8416; G05B 15/02
See application file for complete search history.

(56) References Cited

U.S. PATENT DOCUMENTS

| | | | |
|---|---|---|---|
| 6,106,676 A | 8/2000 | Terry et al. | |
| 2006/0062897 A1* | 3/2006 | Gu | G01N 21/55 427/8 |
| 2010/0279144 A1 | 11/2010 | Frank et al. | |
| 2015/0194295 A1* | 7/2015 | Audronis | H01J 37/3476 204/192.12 |

FOREIGN PATENT DOCUMENTS

| | | |
|---|---|---|
| JP | 2003105536 A | 4/2003 |
| JP | 2020180339 A | 11/2020 |
| KR | 20080093926 A | 10/2008 |

OTHER PUBLICATIONS

Application No. PCT/US2022/019174, International Search Report and the Written Opinion, dated Jun. 28, 2022, 10 pages.

* cited by examiner

*Primary Examiner* — Charles R Kasenge
(74) *Attorney, Agent, or Firm* — Kilpatrick Townsend & Stockton LLP

(57) ABSTRACT

A system may be configured to monitor an amount of a gas species in a processing chamber using Optical Emission Spectrometry. The gas measurement may be provided as feedback to a control process that generates a target setpoint for a gas flow controller into the process chamber. This real-time process may increase/decrease the flow rate of the gas in order to maintain a process deposition mode within a transition region between primarily metallic deposition and primarily compound deposition.

20 Claims, 10 Drawing Sheets

OPTICAL EMISSION SPECTROSCOPY CONTROL OF GAS FLOW IN PROCESSING CHAMBERS

TECHNICAL FIELD

This disclosure generally relates to using optical spectroscopy to provide feedback for controlling gas flow in a semiconductor processing chamber. More specifically, this disclosure relates to using an optical measurement as feedback in a control loop to maintain a target gas level in the processing chamber.

BACKGROUND

Physical vapor definition (PVD), or physical vapor transport, includes a number of vacuum deposition methods that are commonly used to produce coatings and thin films on semiconductor substrates. During a PVD process, a material transitions from a condensed phase to a vapor phase, and then back to a thin-film condensed phase. PVD may be used in manufacturing thin films for chemical, mechanical, electronic, optical, and/or other common functions. Regardless of whether the process uses sputtering or thermal evaporation, PVD processes vaporize a source material to a plasma of atoms or molecules and deposit them on a wide range of substrates. The object to be coated is secured in a fixture placed in the vacuum deposition chamber. Common PVD coatings include metals or metal alloys, such as titanium nitride, to form conductive layers or interconnects on the substrate.

BRIEF SUMMARY

In some embodiments, a method of controlling gas levels in chambers using optical measurements may include receiving, from an Optical Emission Spectrometer (OES), a measurement that is indicative of an amount of a gas species in a Physical Vapor Deposition (PVD) chamber while performing a current process on a semiconductor substrate in the PVD chamber; providing the measurement as a feedback input to a control process that may be configured to maintain a predetermined target amount of the gas species in the PVD chamber; generating a setpoint from the control process for a gas flow controller that controls an amount of the gas species that flows into the PVD chamber while performing the current process on the semiconductor substrate; and causing the gas flow controller to provide the gas species to the PVD chamber using the setpoint from the control process.

In some embodiments, a non-transitory computer-readable medium comprising instructions that, when executed by one or more processors, cause the one or more processors to perform operations that may include receiving, from an Optical Emission Spectrometer (OES), a measurement that is indicative of an amount of a gas species in a Physical Vapor Deposition (PVD) chamber while performing a current process on a semiconductor substrate in the PVD chamber; providing the measurement as a feedback input to a control process that is configured to maintain a predetermined target amount of the gas species in the PVD chamber; generating a setpoint from the control process for a gas flow controller that controls an amount of the gas species that flows into the PVD chamber while performing the current process on the semiconductor substrate; and causing the gas flow controller to provide the gas species to the PVD chamber using the setpoint from the control process.

In some embodiments, a system may include one or more processors and one or more memory devices comprising instructions that, when executed by the one or more processors, cause the one or more processors to perform operations including receiving, from an Optical Emission Spectrometer (OES), a measurement that is indicative of an amount of a gas species in a Physical Vapor Deposition (PVD) chamber while performing a current process on a semiconductor substrate in the PVD chamber; providing the measurement as a feedback input to a control process that is configured to maintain a predetermined target amount of the gas species in the PVD chamber; generating a setpoint from the control process for a gas flow controller that controls an amount of the gas species that flows into the PVD chamber while performing the current process on the semiconductor substrate; and causing the gas flow controller to provide the gas species to the PVD chamber using the setpoint from the control process.

In any embodiments, any and/or all of the following features may be implemented in any combination and without limitation. The method/operations may also include selecting a wavelength associated with the gas species in an output from the OES; and determining a count level for the wavelength associated with the gas species as the measurement that is indicative of the amount of the gas species in the PVD chamber. Selecting the wavelength associated with the gas species may include selecting a wavelength with a highest count level from a plurality of wavelengths associated with the gas species. The method/operations may also include capturing a baseline set of measurements indicative of the amount of the gas species in the PVD chamber over time as a magnet oscillates in the PVD chamber to position a plasma in the PVD chamber, and/or using the baseline set of measurements to normalize the measurement that is indicative of the amount of the gas species in the PVD chamber to minimize an effect of the magnet. The baseline set of measurements may be captured during a previous process performed in the PVD chamber and used during the current process on the semiconductor substrate in the PVD chamber. Normalizing the measurement may include aligning the measurement with the baseline set of measurements in time based on an oscillation period of the magnet. Normalizing the measurement may include dividing the measurement by a value from the baseline set of measurements from a corresponding time in the oscillation period of the magnet. The method/operations may also include accessing a stored set of parameters for the control process, wherein parameters in the stored set of parameters correspond to different predetermined target amounts of the gas species; and selecting a parameter for the control process from the stored set of parameters based on the predetermined target amount of the gas species for the current process on the semiconductor substrate in the PVD chamber. The control process may include a proportional-integral-derivative (PID) controller. The parameter for the control process may include a gain factor for a proportional term in the PID controller. The predetermined target amount of the gas species in the PVD chamber may correspond to a transition region that deposits a sub-stoichiometric film on the semiconductor substrate. The transition region may fall between a metallic deposition mode and a compound deposition mode. The OES may be positioned to view a location where a plasma forms in the PVD chamber. The gas species may include nitrogen. The current process may include depositing titanium nitride on the semiconductor substrate to form one or more interconnects on the semiconductor substrate.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
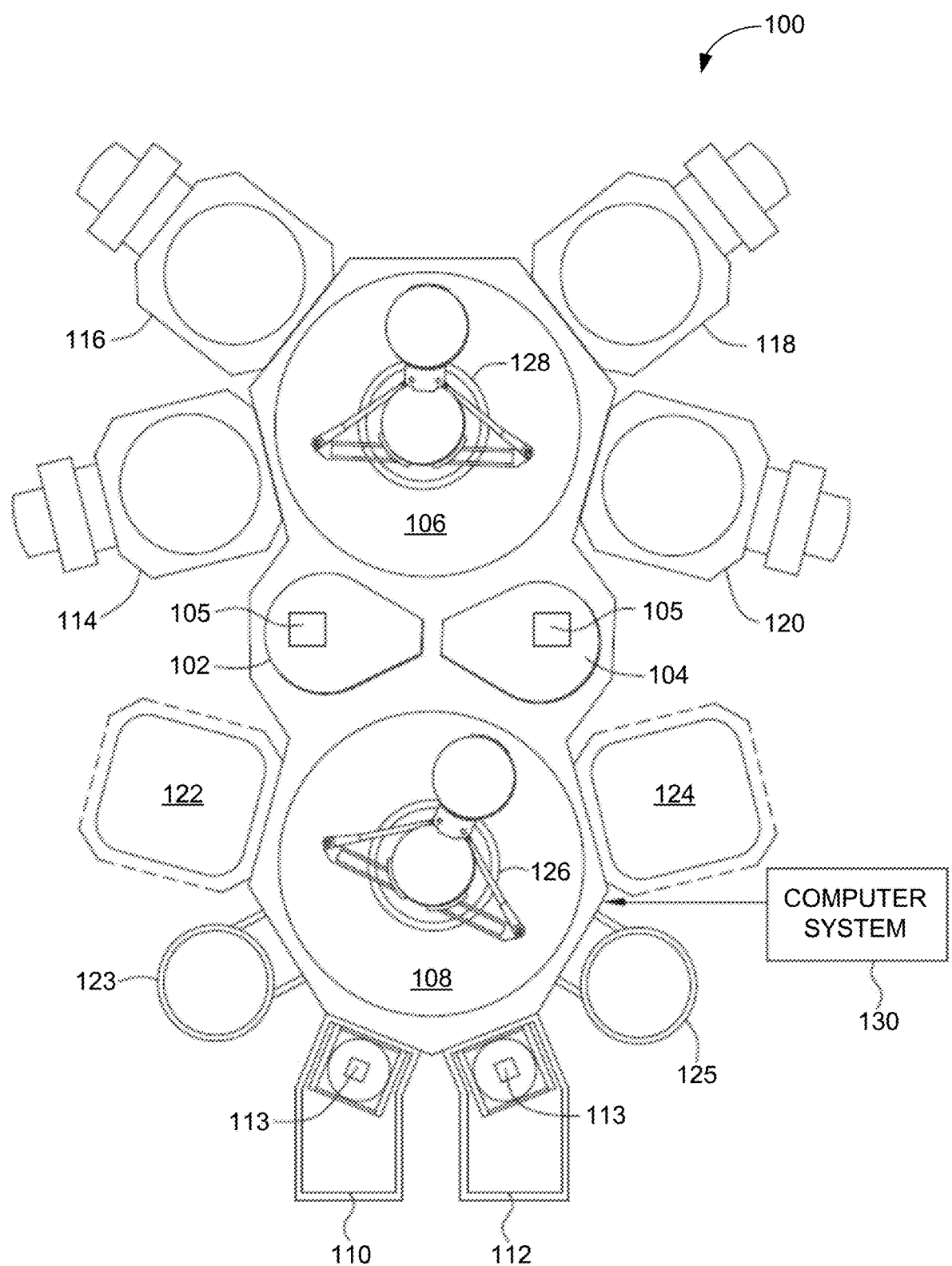
FIG. 1 illustrates a top plan view of a multi-chamber processing system configured to implement some embodiments described herein.

FIG. 1 illustrates a top plan view of a multi-chamber processing system 100 configured to implement some embodiments described herein. The multi-chamber processing system 100 may be configured to perform one or more fabrication processes on individual substrates, such as silicon wafers, for forming semiconductor devices. The multi-chamber processing system 100 may include some or all of a transfer chamber 106, a buffer chamber 108, single wafer load locks 110 and 112, processing chambers 114, 116, 118, 120, 122, and 124, preheating chambers 123 and 125, and robots 126 and 128. The single wafer load locks 110 and 112 may include heating elements 113 and may be attached to the buffer chamber 108. The processing chambers 114, 116, 118, and 120 may be attached to the transfer chamber 106. The processing chambers 122 and 124 may be attached to the buffer chamber 108. The operation of the multi-chamber processing system 100 may be controlled by a computer system 130. The computer system 130 may include any device or combination of devices configured to implement the operations described herein. As such, the computer system 130 may be a controller or array of controllers and/or a general purpose computer configured with software stored on a non-transitory, computer-readable medium that, when executed, performs the operations described herein. One example of a suitable multi-chamber processing system 100 is the Endura® CL System manufactured by Applied Materials, Inc. of Santa Clara, California.

Each of the processing chambers 114, 116, 118, 120, 122, and 124 may be configured to perform one or more process steps in the fabrication of a conductive structure in a semiconductor device, such as a contact structure for a field-effect transistor (FET). More specifically, the processing chambers 114, 116, 118, 120, 122, and 124 may include one or more metal deposition chambers, surface cleaning and preparation chambers, thermal anneal and/or thermal hydrogenation chambers, and plasma hydrogenation/nitridization chambers.

Figure 2:
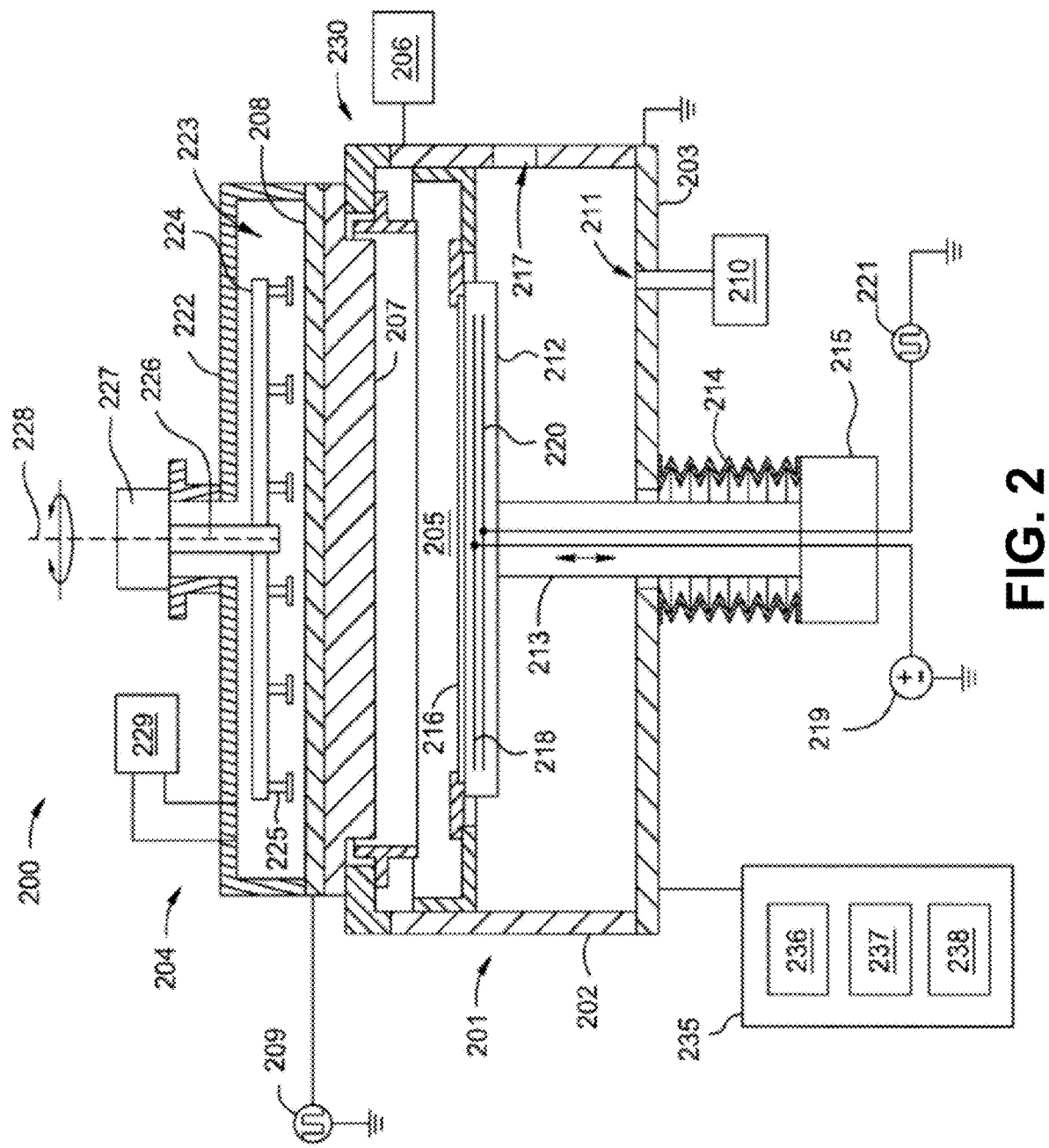
FIG. 2 illustrates a schematic cross-sectional view of a high power impulse magnetron sputtering (HiPIMS) processing chamber, according to some embodiments.

FIG. 2 illustrates a schematic cross-sectional view of a high power impulse magnetron sputtering (HiPIMS) processing chamber, according to some embodiments. The deposition chamber 200 may include a chamber body 201 featuring one or more sidewalls 202, a chamber base 203, and a lid assembly 204, which together may define a processing volume 205. The processing volume 205 may be fluidly coupled to a gas source 206 that provides processing gases to the processing volume 205. A target 207 bonded to a metallic backing plate 208 may be disposed in the processing volume 205 and may be connected to the lid assembly 204. The backing plate 208 may be coupled to a pulsed DC power supply 209 that may generate a pulse to be imposed on the target 207 an ignite a plasma composed of the processing gases in the processing volume 205 by capacitive coupling. The processing volume 205 may be fluidly coupled to a vacuum source, such as one or more dedicated vacuum pumps 210, through a vacuum outlet 211, to maintain the processing volume 205 at sub-atmospheric pressure and to evacuate processing and other gases from the processing volume 205.

The deposition chamber 200 may further include a substrate support 212 disposed in the processing volume 205 that is coupled to a support shaft 213 extending through the chamber base 203. A bellows 214 may circumscribe the support shaft 213 and may be coupled to the underside of the chamber base 203 of the deposition chamber 200 and a base plate on the substrate support 212 connected to an actuator 215 to provide a flexible seal therebetween and to maintain the vacuum integrity of the processing volume 205. The actuator 215 raises and lowers the support shaft 213 and the substrate support 212 disposed thereon to facilitate processing and transferring of a substrate 216 to and from the processing volume 205.

The substrate 216 may be transferred into and out of the processing volume 205 through an opening 217 formed through the sidewall 202, which may be conventionally sealed with a door or valve (not shown) during substrate processing. Typically, a lift pin system (not shown), having a plurality of lift pins (not shown) disposed through the substrate support 212, may be configured to lift the substrate 216 off of the substrate support 212 and enable access to the substrate 216 by a robot handler (not shown) to facilitate transferring of the substrate 216 to and from a surface of the substrate support 212 and in or out of the opening 217.

During processing, the substrate 216 may be secured to the surface of the substrate support 212 by means of electrostatic attraction between the substrate 216 and substrate support 212 created as a result of powering a chucking electrode 218 embedded in a dielectric material of the substrate support 212. The chucking electrode 218 may be electrically coupled to a second power supply 219. The second power supply 219 may be a static DC power supply that provides between about −5000 V and about 5000 V. The substrate support 212 may further include a bias electrode 220, disposed in the dielectric material thereof, which may be electrically isolated from the chucking electrode 218 by the dielectric material of the substrate support 212. The bias electrode 220 may be electrically coupled to a third power supply 221, which may include an RF power supply that operates in a pulsing or continuous wave (CW) mode.

In some embodiments, the substrate support 212 may be further coupled to a cooling base (not shown) that may be used to regulate the temperature of the substrate support 212 and the substrate 216 disposed on the surface during the deposition process. The cooling base may include one or more fluid conduits disposed therein which are in fluid communication with a coolant source (not shown) such as a refrigerant source or a temperature controlled fluid source.

The lid assembly 204 may include a magnetron housing 222 and the target 207 bonded to the metallic backing plate 208 to define a housing volume 223, a magnetron assembly 224 disposed in the housing volume 223, and a ground shield assembly 230 that electrically insulates the target 207 and the metallic backing plate 208 from the sidewalls 202 of the chamber body 201. The magnetron assembly 224 may include a plurality of high strength magnets 225, such as neodymium iron boride magnets, arranged to provide a magnetic field that extends through the target 207 and into the processing volume 205. The resulting magnetic field may trap electrons along magnetic field lines to increase the plasma ion density by enabling additional electron-gas atom collisions.

In some embodiments, the lid assembly 204 may further include a motor 227 coupled to the magnetron assembly 224 by a rotatable shaft 226 that rotates to move the magnetron assembly 224 about an axis 228 during the deposition process. Rotating the magnetron assembly 224 during the deposition process may move high-ion-density regions across the target surface to allow more uniform erosion of material from the face of the target 207 which reduces the non-uniformity of the deposited layer and desirably extends the useful life of the target 207. In some embodiments, the magnetron assembly 224 does not move during the deposition process. In some embodiments, a cooling fluid having a relatively high resistivity may be delivered to the housing volume 223 from a cooling fluid source 229 in fluid communication therewith to cool the magnetron assembly 224 and adjacent backing plate 208 and the target 207.

The deposition chamber 200 may my couple to a controller 235. The controller 235 may include a central processing unit (CPU) 236, a memory 237, and support circuits 238. The controller 235 may be used to control the process sequence, regulate the gas flows from the gas source 206 into the deposition chamber 200, bias the substrate 216 disposed on the substrate support 212, heat/cool and/or maintain the substrate support 212 and/or the substrate disposed thereon at a desired temperature, and/or control ion bombardment of the target 207 by controlling the high voltage pulsed DC power provided to the target 207 and the magnetron housing 222 by the first power supply 209 and by controlling the speed of the magnetron assembly 224 about the axis 228. The CPU 236 maybe a general purpose computer processor configured for use in an industrial setting for controlling processing chamber and sub-processors related thereto. The memory 237 may include random access memory, read only memory, and/or floppy or hard disk drives or other suitable forms of digital storage, local or remote. The support circuits 238 may be coupled to the CPU 236 and may comprise a cache, clock circuits, input/output subsystems, power supplies, and/or other subsystems. In some embodiments, the controller 235 may further include one or more computer readable media. A detailed description of a computing system that may be used to implement the controller 235 is described in greater detail below in this disclosure.

Some embodiments may use chambers similar to those described above to deposit metal compounds onto a substrate. For example, reactive sputtering uses a reactive gas to deposit compounds of a metal and/or gas. For example, a target may comprise titanium metal and may act as a cathode in the chamber. Nitrogen gas may be added to the chamber in order to mix with the titanium and deposit a titanium nitride (TiN) layer on the substrate. This TiN layer may be used to form interconnects or metal layers in a circuit on the substrate. However, the flow of a reactive gas into the chamber may include a hysteresis effect. While TiN may be deposited by saturating the chamber with nitrogen, the TiNx deposition process is an unstable process, and thus the gas flow rate of the reactive gas should be controlled carefully for optimum effect.

Figure 3:
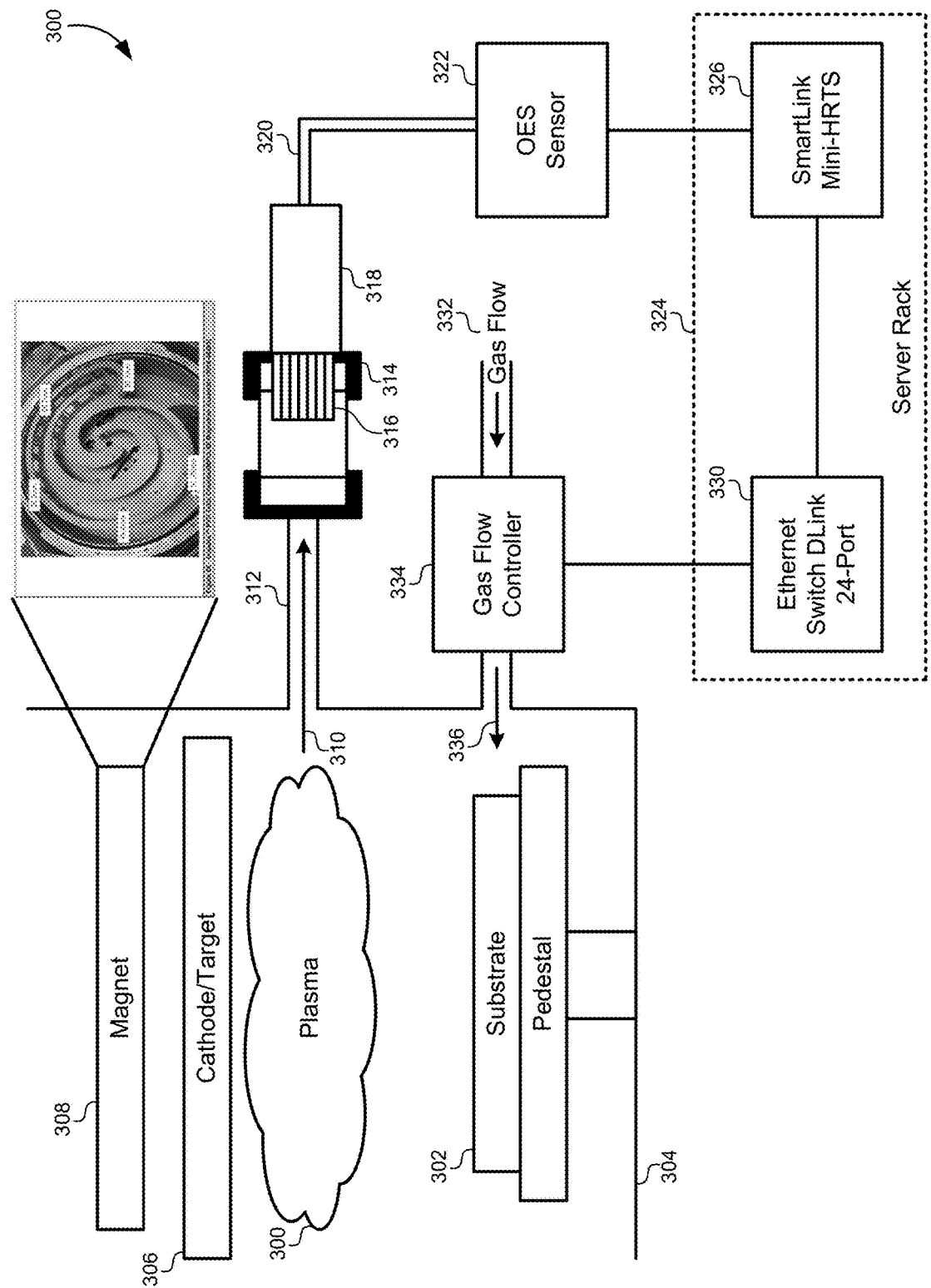
FIG. 3 illustrates a block diagram of a system for controlling the flow rate of a gas into a processing chamber using feedback generated from an Optical Emission Spectrometer (OES), according to some embodiments.

FIG. 3 illustrates a block diagram of a system for controlling the flow rate of a gas into a processing chamber using feedback generated from an Optical Emission Spectrometer (OES), according to some embodiments. A chamber 304 may include a Physical Vapor Deposition (PVD) chamber. PVD represents a process technology in which atoms of conducting material (e.g., aluminum, titanium, etc.) are sputtered from a target 306 or cathode of pure material, then deposited on a substrate 302 to create conductive circuitry within an integrated circuit or other electronic device, such as a flat-panel display. PVD is a thin-film deposition technique that takes place in the vacuum environment of the chamber 304, and solid material from the target 306 may be vaporized and deposited on the substrate 302 as a pure material or an alloy composition coating. As part of the PVD process, a plasma 300 may be formed in the chamber 304, which may include a mixture of metal atoms from the target 306 and gas atoms that are flowed into the chamber 304 during the process. For example, the target 306 may include titanium metal, and a gas 336 that is flowed into the chamber 304 may include nitrogen. The mixture of these two materials may form in the plasma 300 to be deposited on the substrate 302 as a thin-film coating. Note that the use of a PVD chamber that deposits TiN onto the substrate 302 is used herein only by way of example and is not meant to be limiting. The embodiments described herein are compatible with any processing chamber performing any type of process. Gas levels of any type inside the chamber 304 may be measured and used to control the flow of any gas type into the chamber to maintain any environmental condition without limitation.

As a current process on the substrate 302 begins, the plasma 300 may be formed as the gas 306 is flowed into the chamber 304 and as power is applied to the target 306. The plasma 300 may be rotated or moved around the substrate 300 using, among other things, a rotation of a magnet 308 in the top of the chamber 304. The magnetic field created by the magnet moves the plasma 300 to different areas of the substrate 302. For example, oscillation of the magnet 308 may cause the plasma 300 to rotate around the substrate. The plasma 300 tends to equally coat the substrate 302 as the plasma rotates 300 as the plasma coverage is averaged over time. Thus the location of the plasma 300 inside the chamber 304 may change over time as a process executes on the substrate 302.

In order to measure an amount of gas 336 present in the chamber 304, some embodiments may include an OES system that is provided a view of the gas 336 in the plasma 300 and generates a measurement indicative of the amount of gas in the chamber 304. The OES system may include an access port 312 that allows light 310 from the plasma 300 to enter the access port 312. The OES system may include filters or lenses that process the light 310 that enters the access port 312. For example, some embodiments may include a collimator 316 comprising a plurality of thin tubes that generate a high aspect ratio, wherein the collimator 316 minimizes particle flow by trapping the particles while allowing light to flow into a lens 314. The lens 314 may focus the light through a viewport 318 onto a fiber-optic head. The focused light may then be transmitted through a fiber-optic cable 320 to an OES sensor 322.

The OES sensor 322 may generate a measurement that is indicative of relative amounts of gas in the plasma 300. For example, the OES sensor 322 may generate a histogram of counts associated with various wavelengths. Wavelength peaks in the histogram may be associated with different gas species, and a particular count or peak in the histogram may be used to identify a specific type of gas. For example, counts at 775 nm may be used to identify nitrogen gas in the chamber 304. The measurement provided by the OES sensor 322 may include a raw count that is specifically selected and identified as being indicative of a particular gas species.

In some embodiments, the measurement may be provided to a server 324 that includes computing systems configured to process the measurement provided from the OES sensor 322 and generate a setpoint for controlling a gas mass flow controller 334. The computer systems may communicate through Ethernet links using, for example, a hard real-time server 326 that serves as an EtherCAT network master to transmit data between the subsystems, such as the OES and/or the gas mass flow controller (MFC). For example, the server 326 may be programmed to receive titanium and/or nitrogen counts from the OES sensor 322 and execute a control process (described below) to generate a setpoint for the gas mass flow controller 334. The setpoint for the gas mass flow controller 334 may be provided to the gas mass flow controller 334 through an Ethernet switch 330 or through a common EtherCAT network controlled by the hard real-time server 326.

The control process described herein may be executed in real time as a process is being executed on the substrate 302 in the chamber 304. The access port 322 may continuously receive light 310 from the plasma 300 as the plasma 300 rotates and changes position in the chamber 304. The OES sensor 322 may continuously generate measurements that are indicative of the amount of gases in the chamber 304, and the server 324 may continuously generate a setpoint for the gas mass flow controller 334. This allows the gas mass flow controller 334 to dynamically regulate gas flow 332 from a gas source into the chamber 304. For example, if the server 324 determines that there is too much of a specific gas in the chamber 304 the gas mass flow controller 334 may throttle the gas flow 332 such that the gas 336 entering the chamber 304 is reduced.

More generally, if the server 324 determines that a process objective that is correlated with the amount of gas 336 in the chamber 304 is deviating or will deviate from a target objective, the gas flow 332 may be regulated such that the gas amount may control the process objective. One implementation of this type of control process relates to controlling a deposition mode in a PVD chamber to maintain the deposition mode in a region between primarily metallic deposition and primarily compound deposition. The process objective in these embodiments is the mode of deposition being performed, and because this mode is related to the amount of nitrogen gas, the server 324 may generate a setpoint for the gas mass flow controller 334 configured to control the deposition mode precisely.

Figure 4A:
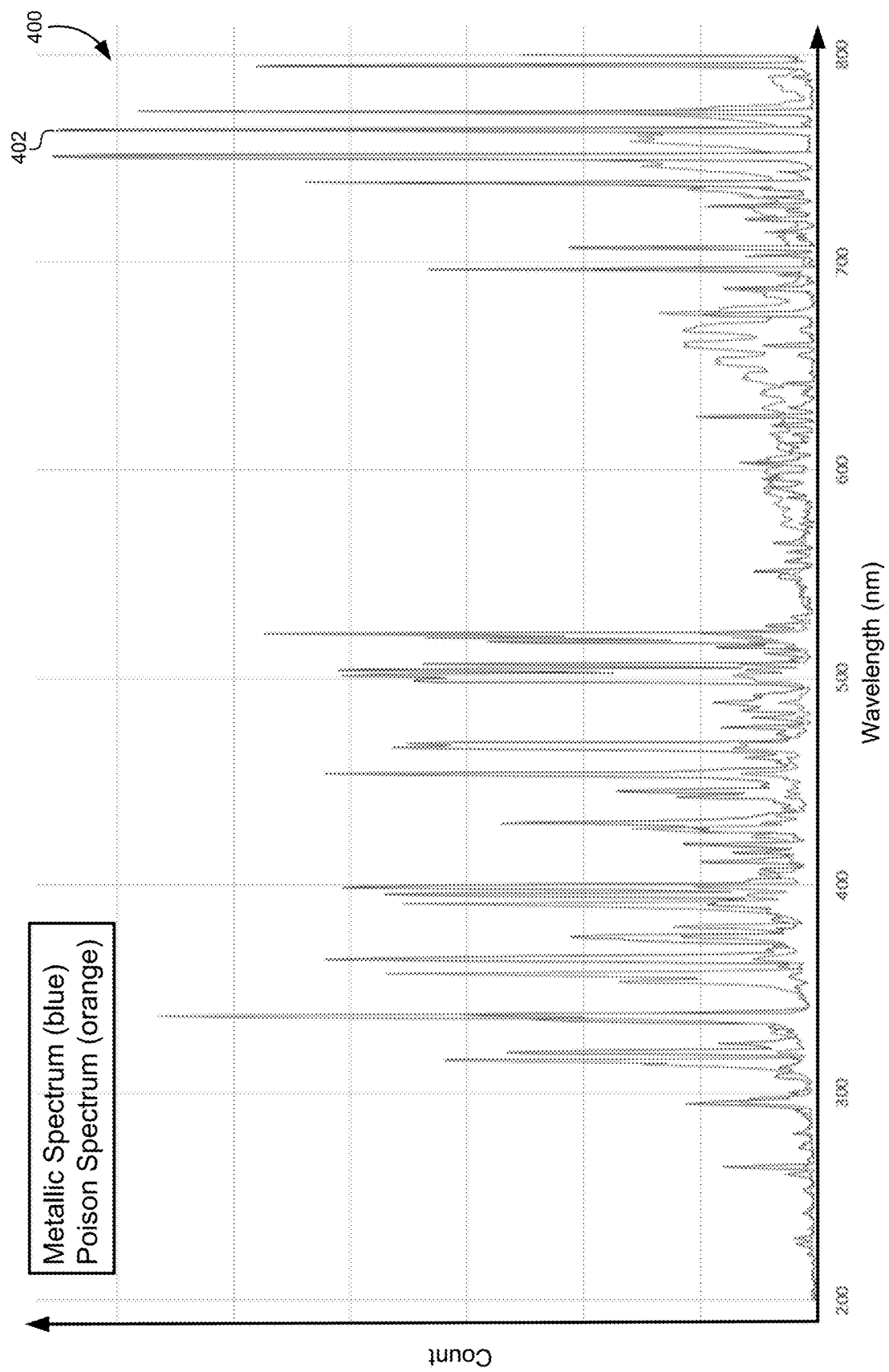
FIG. 4A illustrates a histogram or set of measurements of counts generated by an OES sensor, according to some embodiments.

FIG. 4A illustrates a histogram or set of measurements 400 of counts generated by an OES sensor, according to some embodiments. This histogram or set of measurements 400 may include a count at a specific wavelength 402 related to a specific gas species. For example, by measuring a peak value of the count at the specific wavelength 402, the system may use that specific count to indicate an amount of the corresponding gas in the chamber. Therefore, when receiving the raw OES sensor data, some embodiments may select one specific count or wavelength associated with a corresponding gas type. For example, a specific wavelength known to correspond to nitrogen gas may be used to indicate an amount of nitrogen gas in the processing chamber. Alternatively, some embodiments may select a largest peak in the raw OES data. When generating a measurement indicative of an amount of a specific gas in the processing chamber, this measurement may include the raw OES data, a count at a particular wavelength, a time series of counts at a particular wavelength, and/or a filtered count or time series of counts at a particular wavelength.

Figure 4B:
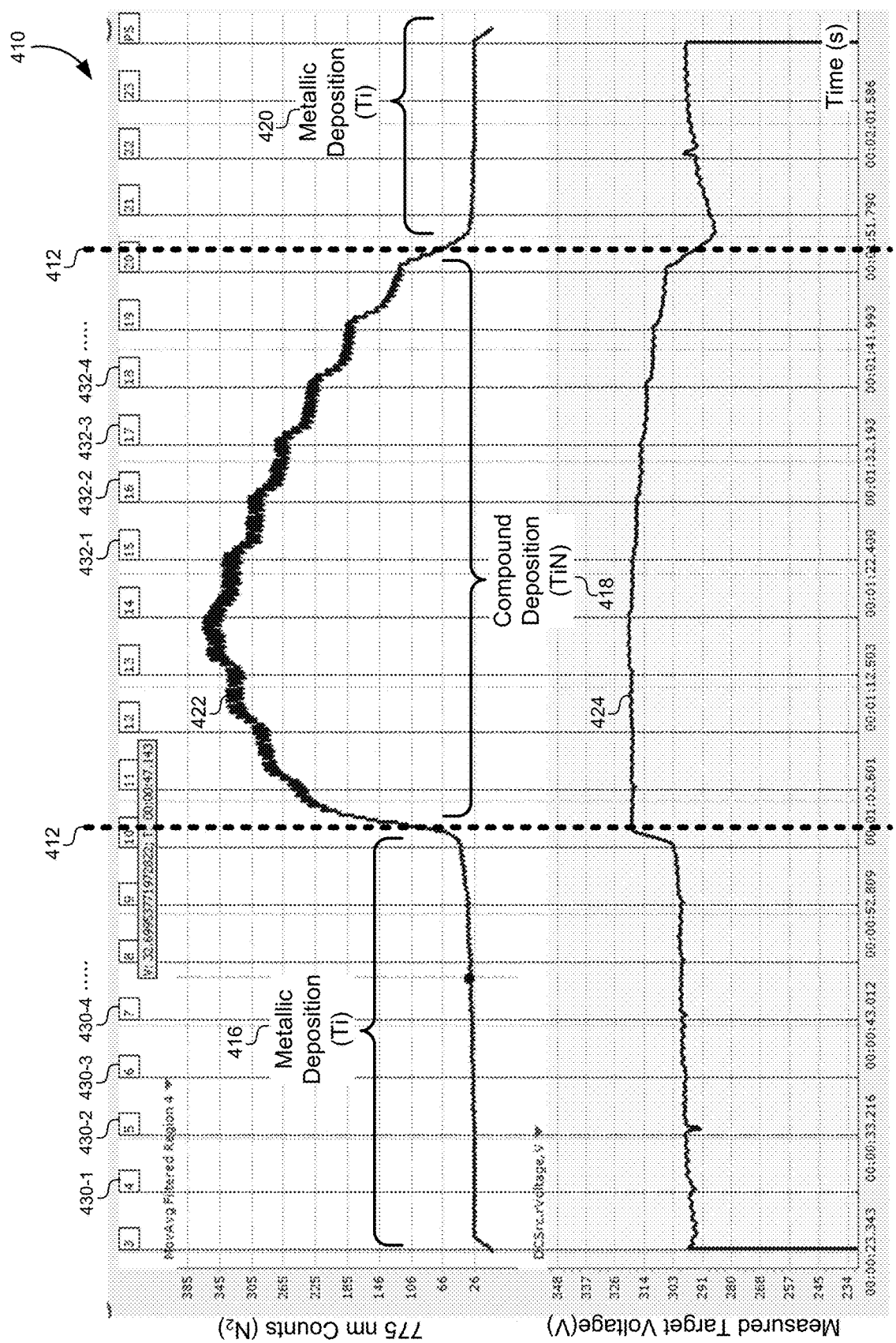
FIG. 4B illustrates a graph of counts received over time for a specific gas species at a specific wavelength, according to some embodiments.

FIG. 4B illustrates a graph 410 of counts received over time for a specific gas species at a specific wavelength, according to some embodiments. This graph 410 illustrates how gas flow affects an amount of gas in the processing chamber as well as a deposition mode for a PVD process. Trace 424 on the bottom of the graph 410 measures a voltage on the target over time. While the chamber may provide a constant power to the target during the PVD process, the overall impedance of the circuit path may change as the process progresses. For example, the deposition mode may form different types of films on the substrate, which may contribute to an increase in the impedance in the circuit path. As the current decreases due to the increased impedance, the voltage measured at the target may increase to maintain a target constant power. As illustrated in the graph 410, the voltage on the target shown on trace 424 may provide evidence of when the process changes between deposition modes.

Trace 422 at the top of the graph 410 illustrates the counts at 775 nm that are indicative of an amount of nitrogen gas in the plasma. As with the measured voltage on the target shown in trace 424, the measured gas in the plasma may also indicate a difference between different deposition modes. For example, during a first portion of the PVD process, the process may operate in a metallic deposition mode 416 in which primarily metal (e.g., titanium) is deposited on the substrate. As the amount of gas in the chamber increases, the processing mode may abruptly change to a compound deposition mode 418, in which a compound of titanium nitride is primarily deposited on the substrate. Note that TiN is not typically considered a dielectric, although it has a lower dielectric constant than pure metal and is generally transitioning towards being a dielectric. Therefore, this deposition mode may be referred to as a "compound deposition mode" 418 rather than a dielectric deposition mode. As the amount of gas in the chamber decreases towards the end of the process, the processing mode may again abruptly switch back into a second metallic deposition mode 420.

The vertical lines 430, 432 illustrate pre-programmed increments of the gas flow rate into the chamber. For example, the vertical lines 430 in the graph 410 may increase the gas flow rate by 10 standard cubic centimeters per minute (SCCM) each from position 3 through position 14. From position 14 through position 23, the vertical lines 432 may decrease the gas flow rate by 10 SCCM each. In this example, the nitrogen gas flow rate increases from 0 SCCM to 100 SCCM and back down to 0 SCCM. This flowrate may be separate from a constant background flow of 100 SCCM of argon gas that comprises many of the plasma ions used to sputter the metal, as the argon gas is inert and does not react with the film or become deposited on the wafer. The results of this regularly programed increase/decrease of the gas flow rate are illustrated by traces 422, 424 in the graph 410. Note that this type of increase/decrease in the gas flow rate causes the deposition modes to operate primarily in the metallic deposition mode 416 and/or the compound deposition mode 422.

It has been discovered that it is possible to perform the PVD process such that a sub-stoichiometric film may be deposited on the substrate rather than a pure metal film or pure dielectric film. In order to deposit a sub stoichiometric film, the deposition mode should be held in a transition region 412 between the metallic deposition mode 416 and the compound deposition mode 422. This transition region 412 is relatively narrow and requires very precise control of the gas flow rate into the chamber to maintain the process in the transition region 412. The embodiments described herein solve this technical problem by using the OES measurements as a feedback input into a control process that generates a real-time setpoint for the gas mass flow controller. This precise form of control using optical spectroscopy data as a feedback mechanism for a control process allows the system to operate continuously in the transition region 412 and thus generate the desired sub stoichiometric film. The term "sub-stoichiometric" in the field of reactive sputtering implies that the film is not yet saturated with nitrogen or oxygen. In the example of titanium and nitrogen, a Ti:N ratio of 1:1 is a fully-nitrogen saturated, or stoichiometric film. In contrast, a ratio of 2:1 would be considered a sub stoichiometric film.

Figure 5:
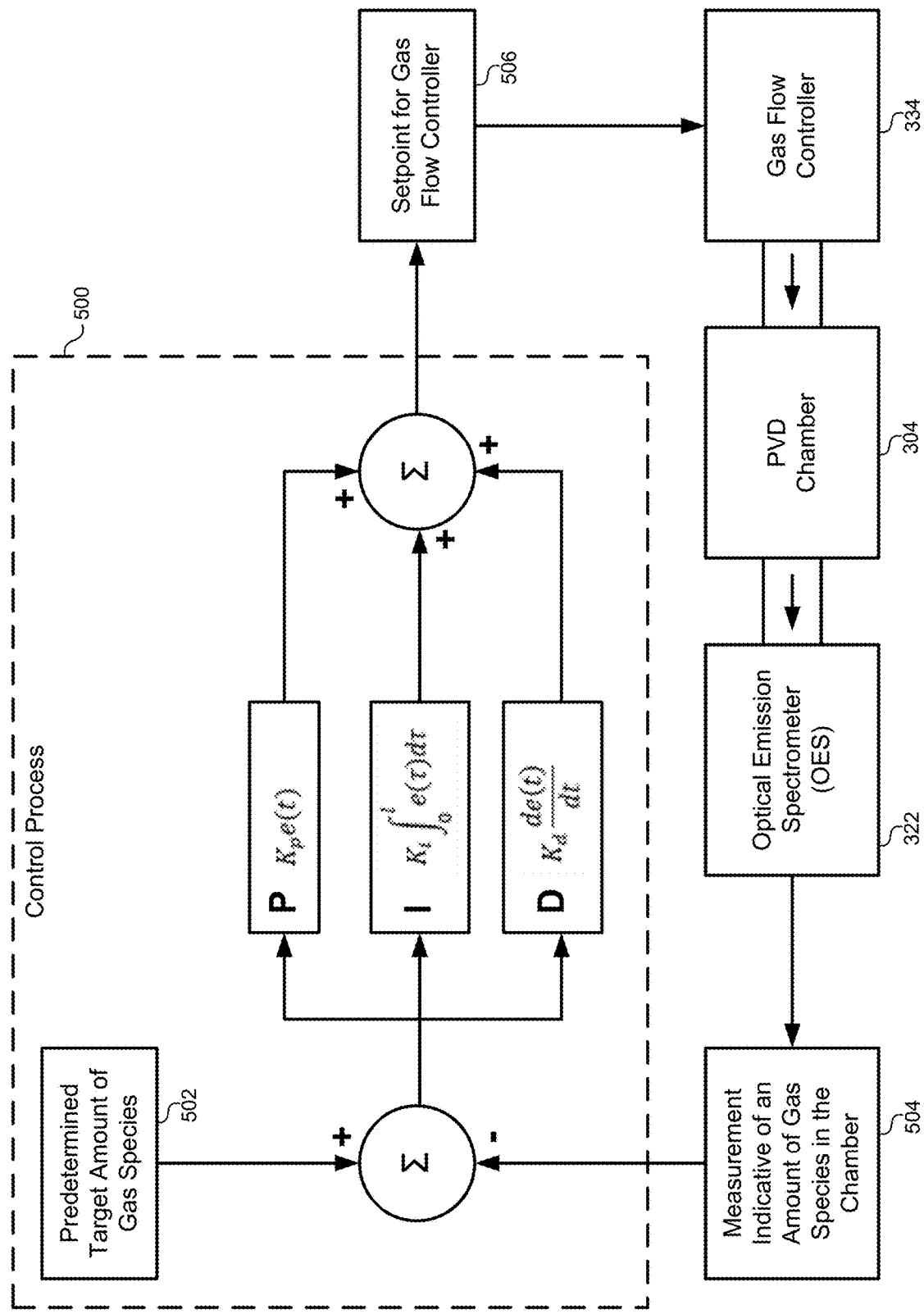
FIG. 5 illustrates a block diagram of a control process that is configured to generate a real-time setpoint for the gas flow controller using spectroscopy data, according to some embodiments.

FIG. 5 illustrates a block diagram of a control process 500 that is configured to generate a real-time setpoint for the gas mass flow controller using spectroscopy data, according to some embodiments. As described above, the OES sensor 322 may receive light output from the plasma in the PVD chamber 304. The OES sensor 322 may generate a measurement 504 that is indicative of an amount of a gas species in the chamber. For example, the OES sensor 322 may output a real-time count at a particular wavelength that is indicative of nitrogen gas. As described below, some embodiments may perform one or more preprocessing routines on the measurement 504 to normalize the measurement and thus compensate for the rotation of the plasma caused by the magnet. An example preprocessing routine is described in greater detail below.

The control process 500 may receive the measurement 504 that is indicative of the amount of the gas species in the chamber as a negative feedback input to the control process 500. The desired setpoint signal for the control process 500 may use a predetermined target amount of gas species 502. This predetermined target amount of gas species 502 may be set individually for each process chamber and each process objective that is controlled by the control process 500. For example, controlling a measurement of nitrogen gas at a level of between approximately 60 counts and approximately 100 counts (with a target value of approximately 70 counts) has been shown to maintain the PVD process in the transition region described above. Note that the number of counts may depend on the exposure time of the optic (e.g., CCD camera) of the OES, which is a parameter that may be set through the EtherCAT interface described above. The exposure time is roughly linear with the number of counts received such that the more time that the CCD array is exposed to light, the more accounts it will register. Some embodiments may also use background subtraction where the background counts from a so-called "dark run" with no plasma in the chamber are subtracted from the counts recorded during an actual process. This predetermined target amount of the gas species 502 may be provided as the desired setpoint for the control process 500.

Any type of control process algorithm may be used by the control process 500. The control process 500 may be carried out by a processor executing on a computing system such as the server described above. Merely by way of example, the control process 500 may use a proportional-integral-derivative (PID) controller, which is a control loop mechanism employing feedback that continuously calculates an error value as the difference between the desired setpoint and the measured process variable. In this example, the desired setpoint is the predetermined target amount of the gas species 502, and the measured process variable may include the measurement indicative of the amount of the gas species in the chamber 504. The PID controller may then apply a correction based on proportional, integral, and/or derivative terms as illustrated in FIG. 5.

The output of the control process 500 may include a setpoint for the gas mass flow controller 506. This setpoint for the gas mass flow controller may be transmitted through the Ethernet/EtherCAT communication system described above to the gas mass flow controller to control the rate of gas flow into the chamber in real time. This allows the control process 500 to compensate for the hysteresis effect illustrated in FIG. 4B. For example, before the process enters the compound deposition mode 418, the control process 500 can react by throttling the gas flow before the abrupt transition occurs. This allows the process to execute in the transition region 412 for prolonged time intervals.

The feedback loop for the control process 500 may be completed as the gas mass flow controller 334 provides gas into the chamber 304. This gas flow may affect the amount of gas in the plasma that is seen by the OES sensor 322. As the gas flow increases/decreases, the measurement 504 indicative of the amount of gas species in the chamber from the OES sensor 322 will increase/decrease in corresponding fashion. The measured change in the concentration of the gas in the plasma then provides the negative feedback for the control process 500.

Figure 6:
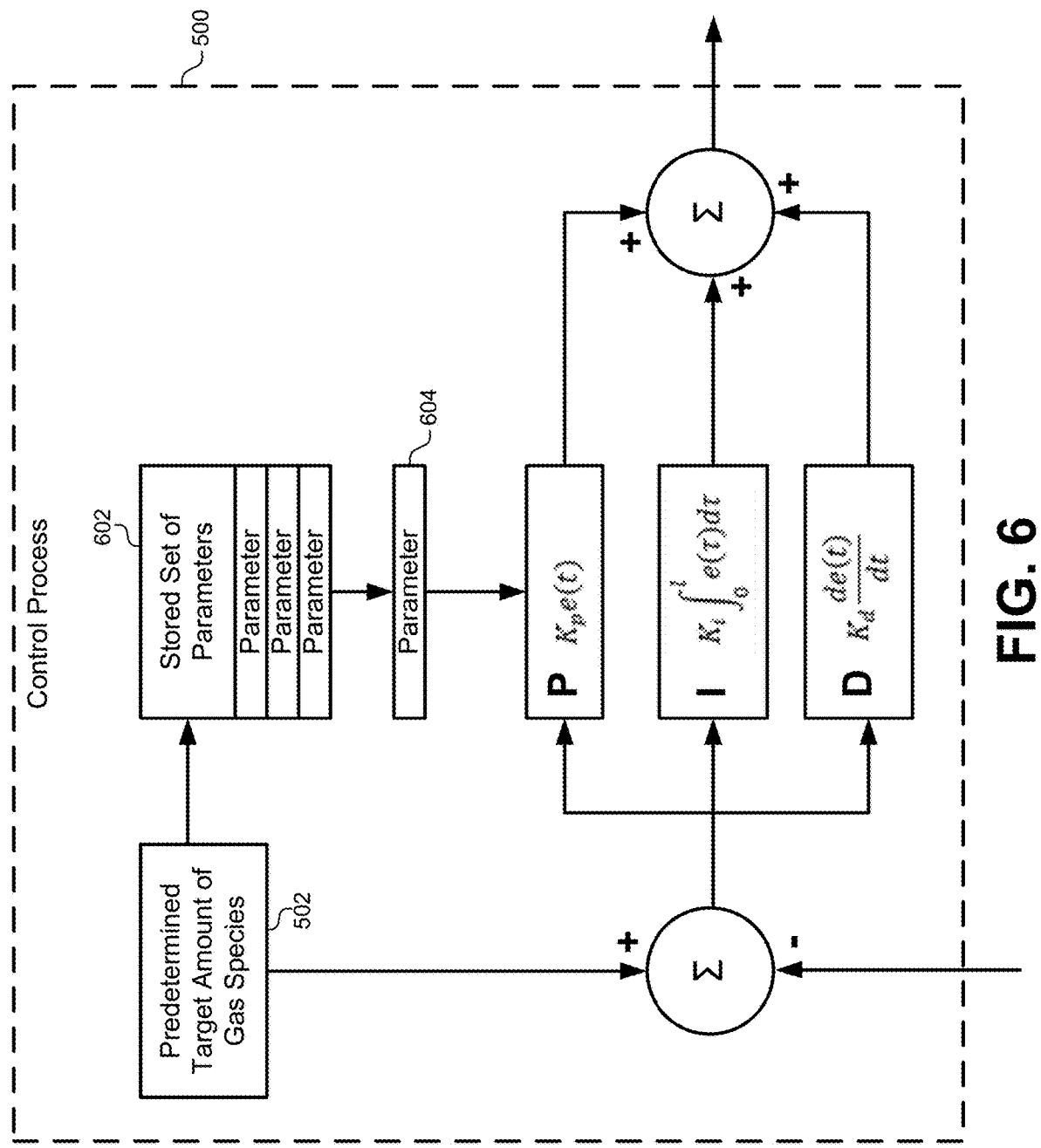
FIG. 6 illustrates a block diagram for selecting stored parameters for the control process 500, according to some embodiments.

FIG. 6 illustrates a block diagram for selecting stored parameters for the control process 500, according to some embodiments. Various parameters in the control process 500 may be adjusted based on the particular predetermined target amount of the gas species 502 used in the current process. In the example of monitoring/controlling nitrogen gas to operate in the transition mode of the deposition process, various predetermined target amounts of nitrogen may be used. Some embodiments may use a target of 60 counts, 70 counts, 80 counts, 90 counts, and so forth. Process parameters may include constants or gain values applied to the P, I, and/or D terms in the PID controller. For example, the $K_p$ constant in the P term of the PID controller may represent a gain, or speed with which the control system 500 can react to changes in the measured gas amount.

However, while reusing the same parameters may work for many of these different predetermined target amounts of nitrogen, some target amounts may cause the control process 500 to become unstable. For example, when using a target of 90 counts, the control process parameters that work for the 60-80 count targets may not allow the control process 500 to keep up with the change in deposition mode in the processing chamber with a target of 90 counts. A higher gain value may be needed for one of the terms in the control process 500 in order to maintain stability at different target values.

Some embodiments may include a stored set of parameters 602 that may correspond to different target amounts of gas species. The stored set of parameters 602 may be developed experimentally by adjusting parameters for the control process 500 until stability is observed and the process operates reliably in the transition region described above. Parameters in the stored set of parameters 602 may correspond to specific target amounts of a gas species. When a predetermined target amount of a gas species 502 is received by the control process 500 as an input, that target amount of gas species 502 may be used to retrieve a corresponding parameter 604 from the stored set of parameters 602. The parameter 604 may then be used by the control algorithm in the control process 500. For example, using a target of 70 counts for nitrogen may use a first gain value from the stored set of parameters 602, while using a target of 90 counts for nitrogen may use a second gain value from the stored set of parameters 602.

Figure 7:
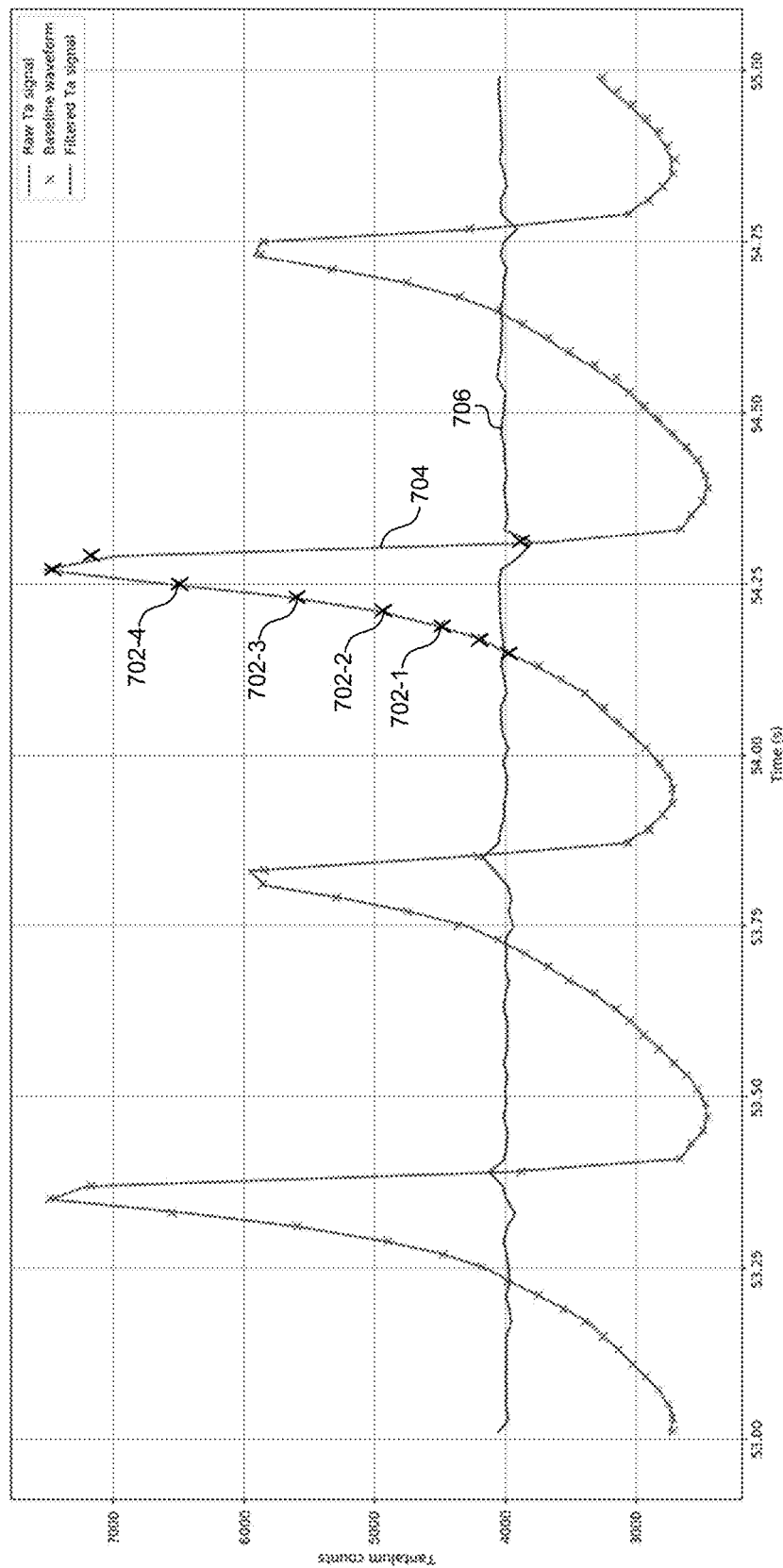
FIG. 7 illustrates a graph depicting how the measurement indicative of the amount of gas in the processing chamber can be normalized to compensate for the plasma rotation caused by the magnet, according to some embodiments.

FIG. 7 illustrates a graph 700 depicting how the measurement indicative of the amount of gas in the processing chamber can be normalized to compensate for the plasma rotation caused by the magnet, according to some embodiments. As described above, a magnet may be present in the processing chamber, and the magnet may move or rotate in order to move or rotate the plasma over the substrate. This motion of the plasma produces an even deposition on the substrate. However, it also introduces technical challenges in measuring the amount of gas in the plasma. Turning back briefly to FIG. 3, the view of the plasma 300 through the access port 312 may change as the magnet 308 rotates. For example, at some points during the oscillation, the plasma 300 may be close to the access port 300, while at other points during the oscillation the plasma may be farther away from the access port 300. The motion of the plasma 300 affects the amount of light and other characteristics of the light 310 that is received by the access port 312 and subsequently provided to the OES sensor 322. The resulting time series of measurements from the OES sensor 322 may have an oscillating characteristic that corresponds to the oscillating frequency of the magnet.

In order to compensate for the changing view of the plasma caused by the rotating magnet, some embodiments may capture a baseline set of measurements that are indicative of the amount of gas in the chamber over time as the magnet oscillates in the chamber. This baseline set of measurements may be recorded at the beginning of each process to be specific to that process. Alternatively, the baseline set of measurements may be recorded at the beginning of a set of processes and reused from a previous process in subsequent processes. The baseline set of measurements may also be recorded when a processing chamber is initialized or installed. The frequency with which the baseline set of measurements may be recorded and/or refreshed may depend on the type of chamber used. For example, if a particular chamber demonstrates a drift in the measured characteristics, a more frequent baselining routine may be established. In contrast, if a particular chamber demonstrates consistency over time, the same baseline set of measurements may be reused over the course of many different processes performed on that chamber.

FIG. 7 illustrates a baseline set of measurements 704 recorded for a particular processing chamber. The baseline set of measurements 704 appears to have a period of approximately 1.00 seconds, which is provided only by way of example and is not meant to be limiting. This particular embodiment measures and amount of gas in the plasma ranging between 2000 counts and 8000 counts, depending on the position of the plasma caused by the rotating magnet. During the baselining procedure, the amount of gas in the plasma may be assumed to be approximately constant, such that the baseline set of measurements 704 approximately captures the effect of the rotating plasma rather than the effect of changing the amount of gas in the chamber. Some embodiments may capture a single period of oscillation at the beginning of a process and use that single set of measurements as the baseline set of measurements 704. Other embodiments may capture multiple periods and average those together to generate the baseline set of measurements 704.

As real-time measurements are received from the OES sensor, the baseline set of measurements 704 may be used to normalize the real-time measurements to remove the effect of the oscillating magnet. First, the individual real-time measurements 702 may be phase-aligned with the baseline set of measurements 704. For example, the real-time measurements 702 may be phase-shifted until a difference between the real-time measurements 702 and the baseline set of measurements 704 are minimized. Next, the real-time measurements 702 may be normalized by dividing these measurements 702 by the corresponding value from the baseline set of measurements 704. A resulting set of normalized measurements 706 may then be provided to the control process. Note that the resulting set of normalized measurements 706 is far more continuous and has removed most of the effect of the magnet oscillation from the measurements.

Figure 8:
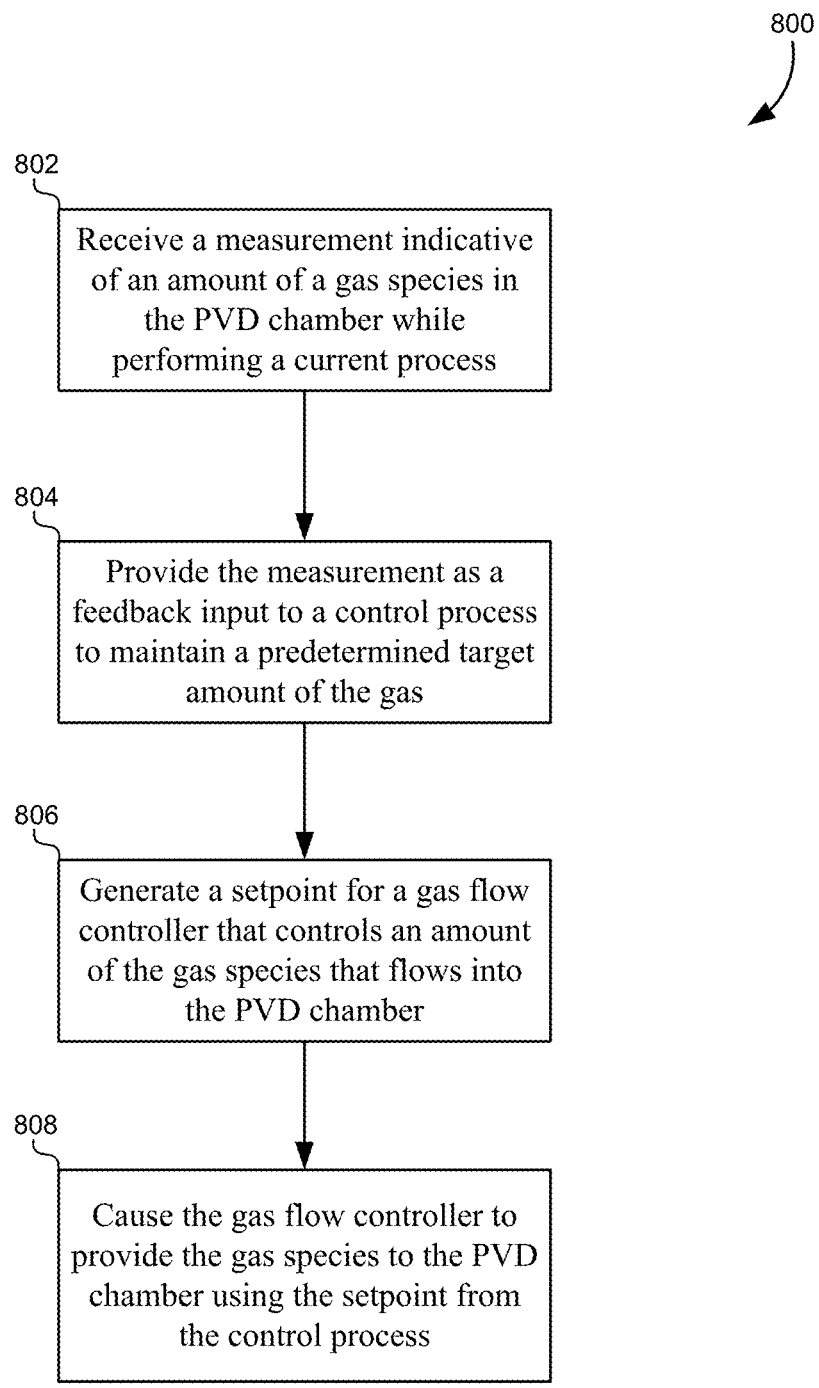
FIG. 8 illustrates a flowchart of a method for controlling gas levels in chambers using optical measurements, according to some embodiments.

FIG. 8 illustrates a flowchart 800 of a method for controlling gas levels in chambers using optical measurements, according to some embodiments. This method may be carried out on a computing system that is coupled to a processing chamber. The computing system may receive inputs from an OES and provide an output to a gas mass flow controller. The computer system may communicate with these devices through additional subsystems that provide an interface. Note that nitrogen and/or oxygen species flow into the chamber as gases, but a portion of these molecules may be ionized to become part of the plasma. The spectral line in the OES signal emitted by a species is roughly proportional to the partial pressure of that species in both the plasma and the gas. Because the plasma is far brighter than the gas, this dominates the readings in the OES signal. However, some embodiments aim to control the partial pressure of a gas species in the entire chamber, not just the portion visible via the plasma emission. This may include reactions in the plasma, in the gas, on the substrate, and/or on the target.

The method may include receiving a measurement that is indicative of an amount of a gas species in a chamber while performing a current process on a semiconductor substrate in the chamber (802). For example, the gas species may be nitrogen, and the chamber may be a PVD chamber. The measurement may be received from an OES and may include raw counts or histograms, single counts at specified wavelengths, filtered data, and/or normalized data to remove an effect of a rotating magnet using a baseline set of measurements. This measurement may be received as described above in FIGS. 3-8 and elsewhere throughout this disclosure.

The method may also include providing the measurement as a feedback input to a control process that is configured to maintain a predetermined target amount of the gas species in the chamber (804). This measurement may be provided as a negative feedback signal that is combined with the predetermined target amount of the gas species. The control process may include any type of control algorithm or process, including a PI controller, a PID controller, and so forth. The control process may operate in real time as measurements are received from the OES to dynamically adjust the gas mass flow controller during operation. The control process may also be configured to maintain a deposition mode of the chamber in a transition region between a metallic deposition mode and a compound deposition mode. The measurement may be provided to the control process as described above in in FIGS. 3-8 and elsewhere throughout this disclosure.

The method may additionally include generating a setpoint from the control process for a gas mass flow controller that controls an amount of the gas species that flows into the chamber while performing the current process on the semiconductor substrate (806). The setpoint from the control process may include a setpoint value that is provided electronically to the gas mass flow controller. The method may further include causing the gas mass flow controller to provide the gas species to the chamber using the setpoint from the control process (808). For example, a computer system may cause the gas mass flow controller to provide nitrogen to the chamber by sending the setpoint value electronically to the gas mass flow controller over a network connection. This process may be carried out continuously, repeatedly, and/or in real-time throughout the current process on the semiconductor substrate.

It should be appreciated that the specific steps illustrated in FIG. 8 provide particular methods of controlling gas levels in chambers using optical measurements according to various embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
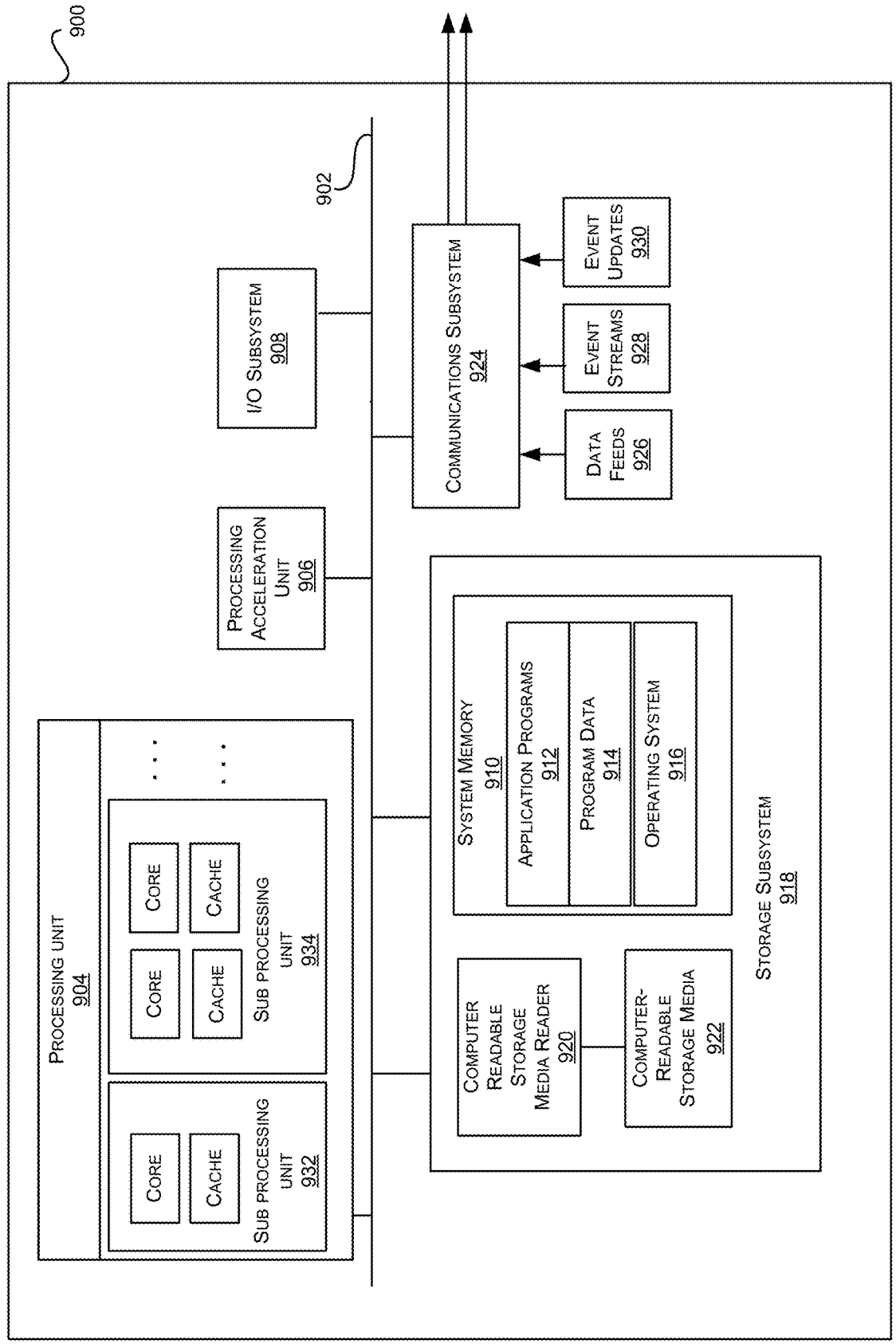
FIG. 9 illustrates an exemplary computer system, in which various embodiments may be implemented.

FIG. 9 illustrates an exemplary computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with some embodiments.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of controlling gas levels in chambers using optical measurements, the method comprising:
    capturing a baseline set of measurements indicative of an amount of a gas species in a Physical Vapor Deposition (PVD) chamber over time as a magnet oscillates in the PVD chamber to position a plasma in the PVD chamber;
    receiving, from an Optical Emission Spectrometer (OES), a measurement that is indicative of an amount of the gas species in the PVD chamber while performing a current process on a semiconductor substrate in the PVD chamber;
    using the baseline set of measurements to normalize the measurement that is indicative of the amount of the gas species in the PVD chamber to minimize an effect of the magnet;
    providing the measurement as a feedback input to a control process that is configured to maintain a predetermined target amount of the gas species in the PVD chamber;
    generating a setpoint from the control process for a gas flow controller that controls an amount of the gas species that flows into the PVD chamber while performing the current process on the semiconductor substrate; and
    causing the gas flow controller to provide the gas species to the PVD chamber using the setpoint from the control process.

2. The method of claim 1, further comprising:
    selecting a wavelength associated with the gas species in an output from the OES; and
    determining a count level for the wavelength associated with the gas species as the measurement that is indicative of the amount of the gas species in the PVD chamber.

3. The method of claim 2, wherein selecting the wavelength associated with the gas species comprises selecting a wavelength with a highest count level from a plurality of wavelengths associated with the gas species.

4. The method of claim 1, wherein the baseline set of measurements is captured during a previous process performed in the PVD chamber and used during the current process on the semiconductor substrate in the PVD chamber.

5. The method of claim 1 wherein normalizing the measurement comprises aligning the measurement with the baseline set of measurements in time based on an oscillation period of the magnet.

6. The method of claim 5, wherein normalizing the measurement comprises dividing the measurement by a value from the baseline set of measurements from a corresponding time in the oscillation period of the magnet.

7. The method of claim 1, further comprising:
    accessing a stored set of parameters for the control process, wherein parameters in the stored set of parameters correspond to different predetermined target amounts of the gas species; and
    selecting a parameter for the control process from the stored set of parameters based on the predetermined target amount of the gas species for the current process on the semiconductor substrate in the PVD chamber.

8. The method of claim 1, wherein the predetermined target amount of the gas species in the PVD chamber corresponds to a transition region that deposits a sub-stoichiometric film on the semiconductor substrate, and the transition region falls between a metallic deposition mode and a compound deposition mode.

9. A non-transitory computer-readable medium comprising instructions that, when executed by one or more processors, cause the one or more processors to perform operations comprising:
    receiving, from an Optical Emission Spectrometer (OES), a measurement that is indicative of an amount of a gas species in a Physical Vapor Deposition (PVD) chamber while performing a current process on a semiconductor substrate in the PVD chamber;
    accessing a stored set of parameters for a control process, wherein parameters in the stored set of parameters correspond to different predetermined target amounts of the gas species;
    selecting a parameter for the control process from the stored set of parameters based on the predetermined target amount of the gas species for the current process on the semiconductor substrate in the PVD chamber;
    providing the measurement as a feedback input and the parameter to the control process that is configured to maintain a predetermined target amount of the gas species in the PVD chamber;
    generating a setpoint from the control process for a gas flow controller that controls an amount of the gas species that flows into the PVD chamber while performing the current process on the semiconductor substrate; and
    causing the gas flow controller to provide the gas species to the PVD chamber using the setpoint from the control process.

10. The non-transitory computer-readable medium of claim 9, wherein the control process comprises a proportional-integral-derivative (PID) controller.

11. The non-transitory computer-readable medium of claim 10, wherein the parameter for the control process comprises a gain factor for a proportional term in the PID controller.

12. The non-transitory computer-readable medium of claim 9, wherein the OES is positioned to view a location where a plasma forms in the PVD chamber.

13. The non-transitory computer-readable medium of claim 9, wherein the operations further comprise:
    capturing a baseline set of measurements indicative of the amount of the gas species in the PVD chamber over time as a magnet oscillates in the PVD chamber to position a plasma in the PVD chamber; and
    using the baseline set of measurements to normalize the measurement that is indicative of the amount of the gas species in the PVD chamber to minimize an effect of the magnet.

14. The non-transitory computer-readable medium of claim 9, wherein the predetermined target amount of the gas species in the PVD chamber corresponds to a transition region that deposits a sub-stoichiometric film on the semiconductor substrate, and the transition region falls between a metallic deposition mode and a compound deposition mode.

15. A system comprising:
    one or more processors; and
    one or more memory devices comprising instructions that, when executed by the one or more processors, cause the one or more processors to perform operations comprising:
        receiving, from an Optical Emission Spectrometer (OES), a measurement that is indicative of an amount of a gas species in a Physical Vapor Deposition (PVD) chamber while performing a current process on a semiconductor substrate in the PVD chamber;
        providing the measurement as a feedback input to a control process that is configured to maintain a predetermined target amount of the gas species in the PVD chamber, wherein the predetermined target amount of the gas species in the PVD chamber corresponds to a transition region that deposits a sub-stoichiometric film on the semiconductor substrate, and the transition region falls between a metallic deposition mode and a compound deposition mode;
        generating a setpoint from the control process for a gas flow controller that controls an amount of the gas species that flows into the PVD chamber while performing the current process on the semiconductor substrate; and
        causing the gas flow controller to provide the gas species to the PVD chamber using the setpoint from the control process.

16. The system of claim 15, wherein the gas species comprises nitrogen.

17. The system of claim 16, wherein the current process comprises depositing titanium nitride on the semiconductor substrate to form one or more interconnects on the semiconductor substrate.

18. The system of claim 15, wherein the operations further comprise:
    capturing a baseline set of measurements indicative of the amount of the gas species in the PVD chamber over time as a magnet oscillates in the PVD chamber to position a plasma in the PVD chamber; and
    using the baseline set of measurements to normalize the measurement that is indicative of the amount of the gas species in the PVD chamber to minimize an effect of the magnet.

19. The system of claim 18, wherein normalizing the measurement comprises:
    aligning the measurement with the baseline set of measurements in time based on an oscillation period of the magnet; and
    dividing the measurement by a value from the baseline set of measurements from a corresponding time in the oscillation period of the magnet.

20. The system of claim 15, wherein the operations further comprise:
    accessing a stored set of parameters for the control process, wherein parameters in the stored set of parameters correspond to different predetermined target amounts of the gas species; and
    selecting a parameter for the control process from the stored set of parameters based on the predetermined target amount of the gas species for the current process on the semiconductor substrate in the PVD chamber.

* * * * *